United States Patent
Zaacks et al.

(10) Patent No.: US 7,280,768 B2
(45) Date of Patent: Oct. 9, 2007

(54) METHOD AND SYSTEM FOR HANDLING OPTICAL SIGNALS

(75) Inventors: Mark Raymond Zaacks, Petach-Tikva (IL); Uri Mahlab, Neve Savyon Or-Yehuda (IL); Yaron Mintz, Kfar Sava (IL)

(73) Assignee: ECI Telecom Ltd., Petach Tikva (IL)

( * ) Notice: Subject to any disclaimer, the term of this patent is extended or adjusted under 35 U.S.C. 154(b) by 713 days.

(21) Appl. No.: 10/469,575

(22) PCT Filed: Feb. 14, 2002

(86) PCT No.: PCT/IL02/00114

§ 371 (c)(1),
(2), (4) Date: Sep. 2, 2003

(87) PCT Pub. No.: WO02/071670

PCT Pub. Date: Sep. 12, 2002

(65) Prior Publication Data

US 2004/0076430 A1    Apr. 22, 2004

(30) Foreign Application Priority Data

Mar. 1, 2001 (IL) .................................. 141740

(51) Int. Cl.
H04B 10/00 (2006.01)
(52) U.S. Cl. .................. 398/193; 398/159; 398/27
(58) Field of Classification Search .......... 398/25–29, 398/34, 35, 38, 162, 192–198, 158–161
See application file for complete search history.

(56) References Cited

U.S. PATENT DOCUMENTS

| | | | |
|---|---|---|---|
| 5,790,289 A | 8/1998 | Taga et al. | |
| 5,802,502 A * | 9/1998 | Gell et al. | 705/37 |
| 6,040,933 A | 3/2000 | Khaleghi et al. | |
| 6,374,112 B1 * | 4/2002 | Widegren et al. | 455/452.2 |
| 6,694,104 B1 * | 2/2004 | Caplan et al. | 398/197 |
| 6,728,217 B1 * | 4/2004 | Amirijoo et al. | 370/252 |
| 6,996,075 B2 * | 2/2006 | Santhoff et al. | 370/310 |

FOREIGN PATENT DOCUMENTS

| | | |
|---|---|---|
| EP | 0 926 854 | 6/1999 |
| EP | 942561 A2 * | 9/1999 |
| WO | WO 01/08422 | 2/2001 |

OTHER PUBLICATIONS

Forghieri et al., Simple Model of Optical Amplifier Chains to Evaluate Penalties in WDM Systems, Sep. 1998, Journal of Lightwave Technology, vol. 16, No. 9.*

Shoko Ohteru et al ,"Optical signal Quality Monitor Using Direct Q-Factor Measurement", IEEE Photonics Technology Letters, IEEE Inc. Nw York, US vol. 11, No. 10, Oct. 1999.

"Optical Interfaces for Multichannel Systems with Optical Amplifiers", International Telecommunication Union, G.692, Oct. 1998.

* cited by examiner

Primary Examiner—Agustin Bello
(74) Attorney, Agent, or Firm—Browdy and Neimark, PLLC

(57) ABSTRACT

A method and a system for performing pre-emphasis of one or more optical channels respectively carrying one or more optical signals, by effecting bit rate of the one or more of the signals, thereby adjusting BER value thereof.

13 Claims, 4 Drawing Sheets

METHOD AND SYSTEM FOR HANDLING OPTICAL SIGNALS

FIELD OF THE INVENTION

The present invention relates to a method and a system for pre-emphasis in optical systems, such as multi bit rate WDM systems.

BACKGROUND OF THE INVENTION

In optical networks, chains of amplifiers and other network elements usually add spontaneous noise, thus degrading the optical signal which causes appearance of transmission errors. One of the main parameters of optical transmission—the required Optical Signal-to-Noise Ratio (OSNR) of a specific signal—depends on the initial signal power. The distance and number of amplifiers in the chain via which an optical signal is transmitted, also influence the overall OSNR and thus degrades the overall network performance. Standards in the field of optical communications (for example, ITU-T Standard Recommendation G.692, 10/98) refer to so-called pre-equalization for equalizing powers of optical signals which are degraded due to optical amplifiers' gain tilt. The pre-equalization partially compensates amplifier gain variation and gain tilt using the following scheme. The highest channel power in the system is assigned to the channel which will undergo the least line amplifier gain, whereas the lowest channel power is assigned to the channel that will undergo the most channel line amplifier gain. If pre-equalization is not used, the amount of channel power difference at the transmit interface leads to a reduction in the amount of amplifier gain variation and gain tilt which can be tolerated by the system.

U.S. Pat. No. 5,790,289 describes a wavelength division multiplexed (WDM) optical communication method and apparatus using a pre-emphasis technique to adjust the attenuation of a particular optical channel at a transmitter terminal to produce identical signal-to-noise ratios for all of the optical channels at a receiver terminal. The pre-emphasis adjustments to the transmitted signals are made on the basis of signal-to-noise ratio measurements performed at the receiver terminal. The signal-to noise ratio values for each channel are transmitted through a facing line that is also used to transmit data along optical communication lines from the receiver terminal back to the transmitter terminal.

U.S. Pat. No. 6,040,933 describes a method and apparatus for channel performance equalization in wavelength division multiplexed (WDM) systems. Performance of the channels is estimated from optical power measurements of each signal transmitted by the channels. The measurements are taken at the inputs of optical amplifiers in the transmission path of the system. The channels are equalized by adjusting the optical power of the channel transmitters. The method can compensate for signals having different bit rates by applying an offset to the amount of optical power adjustment of the channel transmitters. Furthermore, if different types of optical amplifiers are used in the transmission path, the method can accommodate different noise characteristics of the amplifiers by using their noise figures in determining the amount of optical power adjustment of the transmitters that is required to equalize channel performance.

OBJECT OF THE INVENTION

The object of the invention is to provide a new method and a suitable system for effecting pre-emphasis in one or more channels of an optical telecommunications system.

SUMMARY OF THE INVENTION

It should be clarified that the final purpose of performing pre-emphasis in optical systems, particularly in WDM systems with multiple optical channels, is to obtain transmission with favorable (i.e., minimal) bit error rates (BER) and predetermined respective quality of service (QoS) parameters. Those skilled in the art know that the Bit Error Rate (BER) of a particular optical channel is a function of a plurality of factors, such as:

$$BER = f(BR, OSNR, P, FEC, CD, PMD, NL, \text{etc.}),$$

where
1. BR—bit rate of transmission via the particular optical channel,
2. OSNR—optical signal to noise ratio measured at the end of the particular optical channel,
3. P—power launched in the particular optical channel,
4. FEC—forward error correction feature which may be provided to the particular channel,
5. CD—chromatic dispersion effects active in the channel,
6. PMD—polarization mode dispersion effects,
7. NL—existence of non-linear effects in the channel, and where factors 2, 5, 6, 7, in turn, are functions of distance. It is understood that in the optical Add/Drop architecture, each channel may pass different distances.

The Inventors have come to the conclusion that the above object can be reached by a new method comprising adjusting parameters of the transmitted signal(s) which have never been adjusted before, for example by affecting bit-rate of the signal(s).

To the best of the Applicant's knowledge, none of the presently known optical single-channel or multi-channel systems utilizes the channel(s) pre-emphasis (or adaptation, or equalization) by means of bit rate adjustment. It has been found by the Inventors, that in most cases such an adjustment enables both main and fine tuning of the optical signal to finally obtain more accurate transmission having a better Quality of Service.

According to one basic version of the method of adjusting BER value in one or more optical channels performing data transmission with respective bit rates, the method comprises steps of a) obtaining BER value for the one or more optical channels, b) reducing bit rate in one or more of the optical channels having the obtained BER value exceeding a maximally accepted absolute or relative BER value, thereby adjusting the BER value thereof.

According to one possible version of the method, it comprises a preliminary step of defining the maximally accepted absolute BER value for said at least one optical channel.

In another version of the method, i.e., in the case of a multi-channel optical system such as a WDM optical system, the method comprises:

stating Quality of Service priorities for its optical channels as a set of priority ratios, defining required ratios of BER values of the optical channels as a logically inverse set of said set of priority ratios, and regulating the obtained BER values of the optical channels under constraint of said priorities by adjusting bit rates of at least one of the optical channels to obtain real ratios of BER values of the optical channels substantially equal to said required ratios.

In the latter version, i.e., when adjusting BERs with taking into account the prioritizing of the optical channels, there are achieved non-absolute, but optimal relative BER values of the optical channels. The prioritizing, i.e. the step of defining the mentioned set of priority ratios can be performed in a number of ways, for example:

based on the prices stated for transmission over different optical channels, i.e., the greater the price the higher the priority;

based on at least one required Quality of Service (QoS) parameter, for example, based on an acceptable delay time for a particular type of service: the highest priority can be assigned for data, the lowest priority—for voice; another example—based on the type of service and an acceptable bit error rate (BER).

More particularly, the method of pre-emphasis of a multi-channel system can be performed by the following steps:

determining a set of priority ratios by finding, for a group of the optical channels, relations of stated priorities (say, by forming relation(s) of predetermined prices, or relations of priority values connected with particular types of service), considering said set of priority ratios to logically present an inverse set of ratios between the required BERs of said group of the channels, thereby obtaining a set of required BER ratios, obtaining current BER values at each optical channel of said group and forming a set of real BER ratios for the same group of the optical channels, comparing the formed set of real BER ratios and said set of required BER ratios, and if not substantially equal for at least one of said channels, performing the adjustment in said at least one optical channel, obtaining BER values for at least the channel(s) where the adjustment were performed and forming a set of new BER ratios for said group, comparing the set of required BER ratios with the set of new BER ratios, continuing the adjustment until the set of new BER ratios is substantially equal to the set of required BER ratios.

The step of determining a set of priority ratios may comprise constructing said ratios based on a priority of one of said optical channels selected as a reference to the remaining ones from the group. In the simplest case, the group may comprise all the channels of the system.

The term "obtaining BER values" comprises either direct measurement of BERs at each of the channels, or obtaining the BER values by calculations based on other parameters measured or given directly. For example, BER (Bit Error Rate or Probability of error) can be estimated, if Q (Quality factor of the signal) is known. Q can be directly measured, and BER can then be mathematically or graphically estimated based on the function $$BER = \frac{1}{2} * erfc(Q/\sqrt{2}) \qquad (1)$$

which is known to those skilled in the art (for example, Govind P. Agrawal. Fiber-Optic Communication systems. $2^{nd}$ ed. Wiley series in microwave and optical engineering. A Wiley Inter-science publication. 1997, p.172-173)

In one particular and practical version of the method of regulating BER value in one or more optical channels, each comprising a transmitter terminal, a receiver terminal, one or more amplifiers and dispersive fiber elements there-between, the method comprises additional adjusting, in said at least one channel, one or more physical parameters from a non-exhaustive list comprising power (P), and characteristics of dispersion.

The power and dispersion may be adjusted at any point of the channel, while the bit rate—only at the transmitter.

The term "characteristics of dispersion" means at least one factor from the list comprising CD and PMD.

The version of the method, where additional physical parameters are adjustable, is applicable both to approaching an absolute, and an optimal relative value of BER in the optical communication channels of a multi-channel optical system.

It should be noted that the step of additional adjusting can be performed at an arbitrary point between a transmitting terminal and a corresponding receiving terminal of a suitable optical channel. Since optical channels may have different lengths, the step of additional adjusting may comprise power de-emphasizing of optical signals passing shorter distances.

It has been realized by the Inventors, that each of the above-mentioned physical parameters affects BER in a channel in its specific way. For example, increasing bit-rate in a channel will increase the electrical bandwidth and hence—increase of the total noise received. Power increase in a particular channel, relatively to other channels in the system, leads to increasing the physical parameter OSNR (optical signal to noise ratio) which is always good for reducing BER, while simultaneously causes non-linear effects which lead to distortions and hence to increasing BER in the particular channel. Likewise, adjusting the dispersion so that the total dispersion at the receiver is close to 0 always improves BER. In other words, there is usually a trade off situation with regulation of the optical channels, such as a trade off between non-linear effects and amount of dispersion in a link at any given point, or a trade off between a signal power and a non-linear signal distortion.

The above-described method can be explained based on the following equation known for modeling optical systems [Fabrizio Forghieri, R. W. Tkach, D. L. Favin. Simple model of optical amplifier chains to evaluate penalties in WDM systems. IEEE Journal of lightwave technology, vol. 16. No. 9, Sept. 1998]. It should be noted that this model has not been ever used for controlling BER in multi-channel optical communication systems, such as WDM.

$$Q = \frac{OSNR}{\sqrt{2*OSNR+1}+1}\sqrt{\frac{B_o}{B_e}} \qquad (2)$$

where

Q is a quality factor of the signal;

$B_o$—is the bandwidth of the optical filter at the receiver, $B_e$—is the bandwidth of the electrical filter of the receiver;

The electrical bandwidth is directly proportional to the bit rate utilized in the channel.

Therefore, if one increases $B_e$ (proportional to the bit rate), the required OSNR for preserving the constant Q must increase, as can be seen from the above equation. It means, that if one reduces the bit rate (and, proportionally, the $B_e$), the required OSNR for preserving the constant Q may be reduced. The equation (2) can also be used for estimating BER when Q is measured directly.

According to another aspect of the invention, a system is also provided for performing pre-emphasis in at least one optical channel for transmitting data, the system being capable of obtaining BER value at a terminal point of said at least one optical channel, processing said obtained BER value and adjusting bit-rate at a transmission point of said optical channel thereby regulating the BER value.

Further aspects and details of the invention will become apparent as the description proceeds.

BRIEF DESCRIPTION OF THE DRAWINGS

The invention will further be explained with reference to the following non-limiting drawings in which:

FIG. 1b is an exemplary schematic graphical diagram showing how BER=½*erfc(Q/$\sqrt{2}$) depends on bit rate of an optical signal, taken for the same range of bit rates as in FIG. 1a.

DETAILED DESCRIPTION OF THE PREFERRED EMBODIMENTS

Figure 1A:
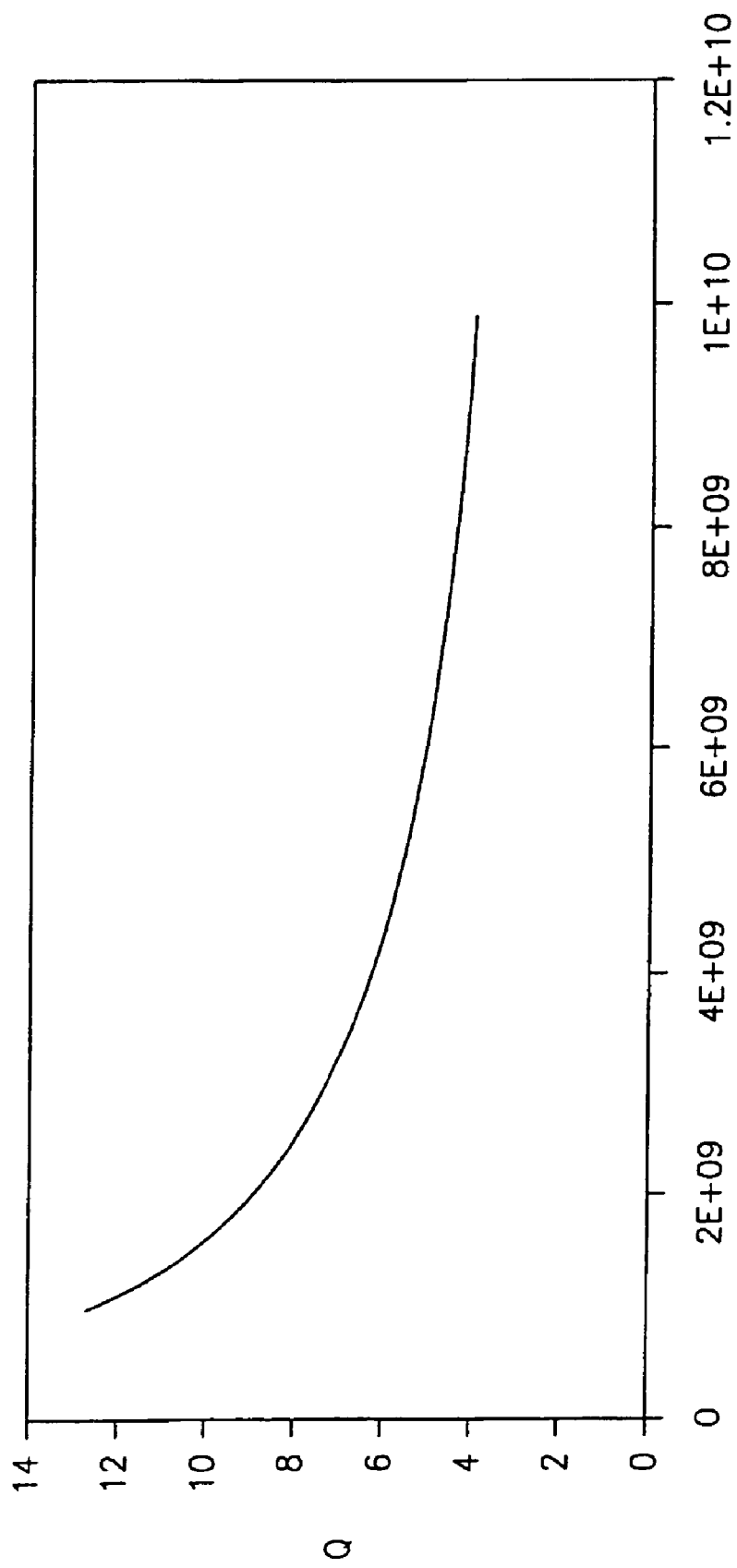
FIG. 1a is an exemplary graphical diagram of dependency of the quality factor Q of an optical signal from the bit rate in the optical channel.

FIG. 1 illustrates a simplified version of the graphical relation between a bit rate (BR) in a single optical channel and the (Q) factor of an optical signal transmitted through the channel. The graph is built for an exemplary range of bit rates, using equation (2) with considering all other arguments in the equation to form a constant. The schematic graph shows that generally, increase of the bit rate should lead to reduction of the Q factor in the optical channel, while degree of the reduction depends on specific ranges of the bit rate.

Figure 1B:
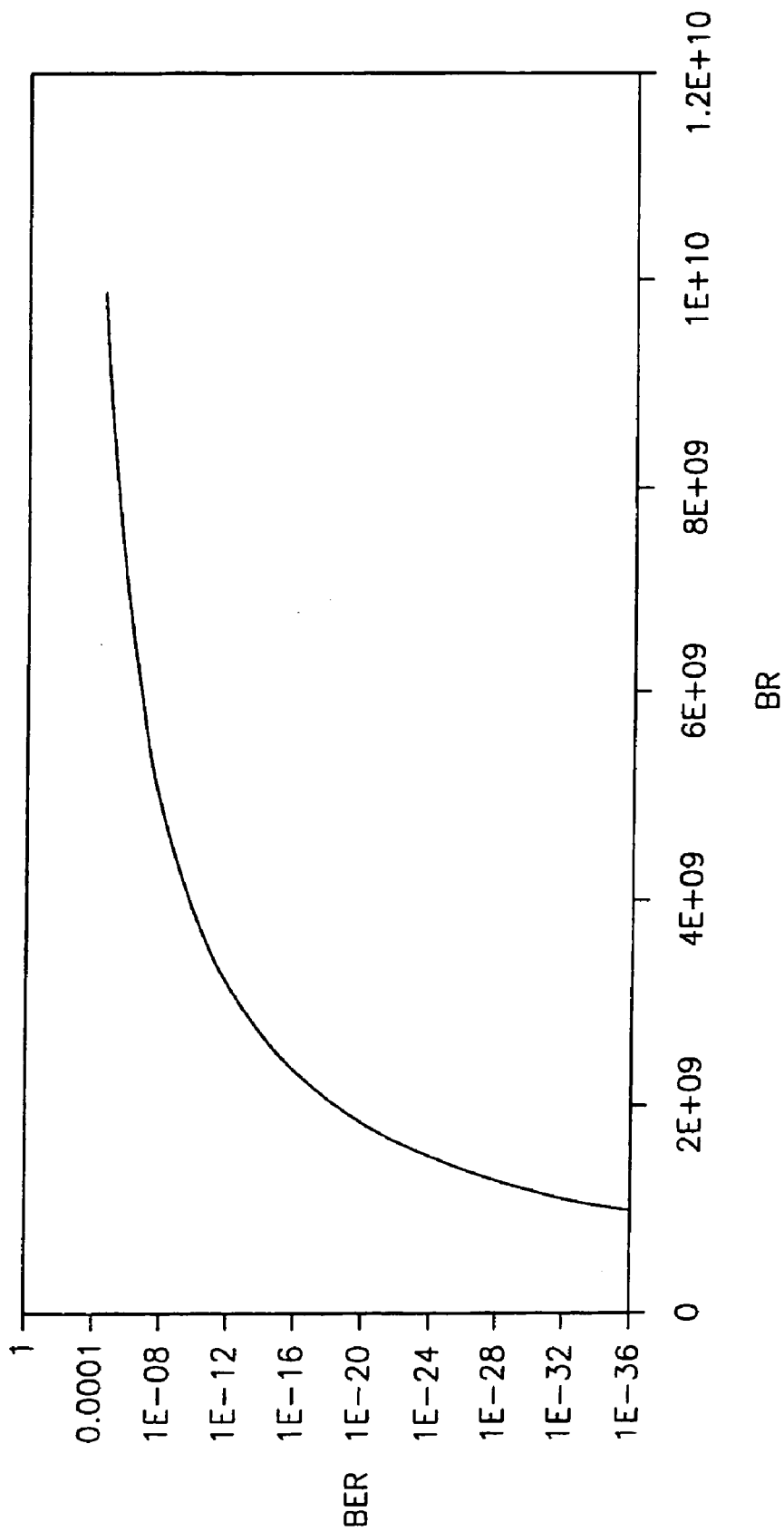

FIG. 1b. The drawing illustrates how the Bit Error Rate (BER) parameter of an optical signal can be influenced by changes of the signal bit rate (BR) in a particular range of 2 Gbps to 6 Gbps. It can be seen that in this range, changes of the bit rate bring fluctuations of the BER. The graph is built for particular given values of OSNR, dispersion characteristics and system parameters. It should be noted that if OSNR value decreases, the graph will shift leftwards, i.e. to achieve a desired BER value at a decreased OSNR a lower bit rate will be required. The illustrated graph is only an example and a similar effect can be noticed for other bit rate ranges.

Figure 1C:
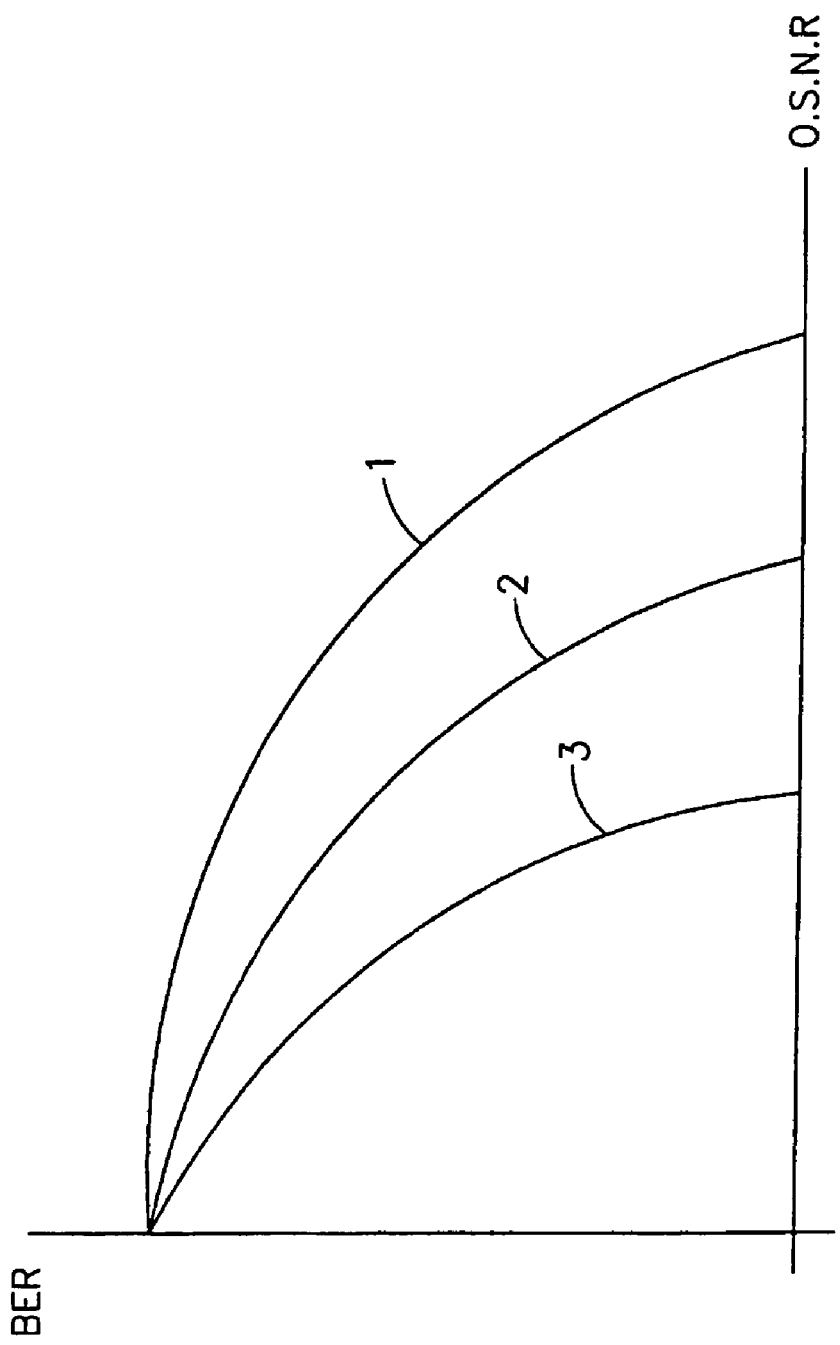
FIG. 1c is a schematic and simplified graphical diagram of relation between the BER and OSNR ratio in one or more optical channels.

FIG. 1c. illustrates another schematic graph which shows a simplified relation between the OSNR (being a direct function of power P) and the BER for different optical bit rates. In the drawing, the curves marked 1, 2, 3 respectively reflect channels carrying optical signals with different bit rates, where Bit rate (1)>bit rate (2)>bit rate (3).

Figure 2:
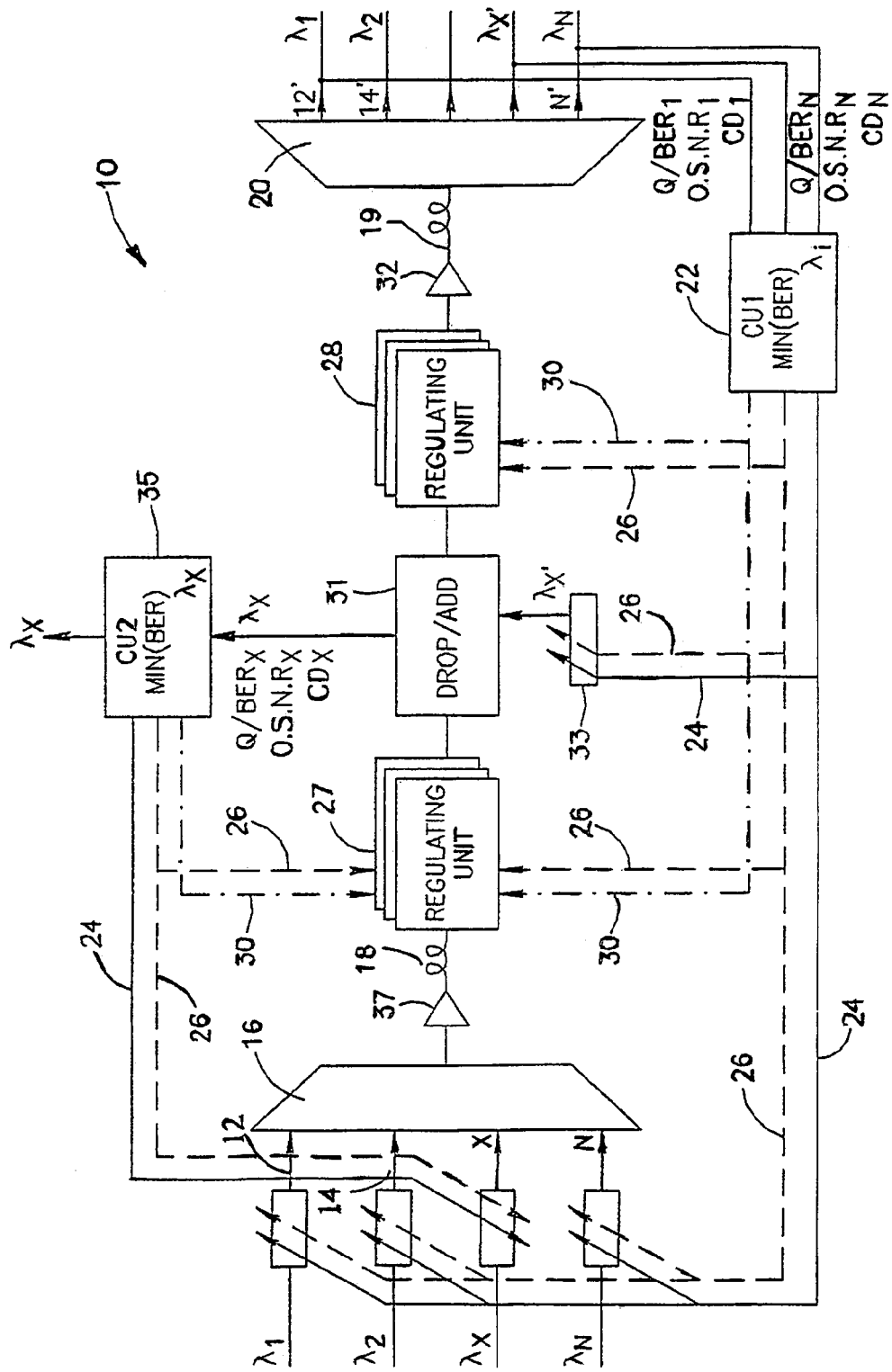
FIG. 2 is a schematic block diagram of a system for performing pre-emphasis in an optical system, according to one version of the inventive method.

FIG. 2 shows how a multi-channel optical system 10, such as a WDM system, can be regulated based on the proposed method. Each of the optical channels 12, 14, . . . N of the system comprises a transmitting terminal marked with the same numbers 12, 14, . . . N, a receiving terminal and optical equipment there-between. Data transmitted via the optical channels, using different wavelengths λ1 to λN and different bit rates, is multiplexed by a WDM multiplexer or combiner 16 and transmitted via an optical fiber 18 in the multiplexed or combined form. The data transmitted in this form via the optical fiber 18, passes various active and passive units which will be mentioned below, is transmitted via a farther optical fiber 19, and is finally demultiplexed by a WDM demultiplexer (decomposer) 20 into optical channels 12', 14' . . . N'. It should be emphasized that the proposed method is also applicable to channels, which are added or dropped on the way, and not only to those which remain the same from the transmitting to the receiving point; specific steps and relevant features will be discussed further below.

All signals received in the respective optical channels 12', 14', . . . N' at the receiving terminal point are characterized by their BER values and other parameters (OSNR, CD, etc.) which can be directly or indirectly measured or calculated. Making decision on pre-emphasis in each of the optical channels depends not only on the plurality of the parameters which can be obtained at the terminal point, but also on so-called "given network parameters", for example—priorities which are stated for the system channels. A control unit CU1 22 having a memory block and a processor, is responsible for collecting the necessary information from each of the channels (such as values of OSNR, CD, and, of course, the Bit Error Rate or Q); it also stores the network parameters such as FEC—Forward Error Correction feature and the priority ratios, if implemented in the system. The Control Unit (CU1) 22 accomplishes quite a complex multi-parameter and multi-purpose processing of the obtained and stored parameters and issues pre-emphasis decisions for respective channels of the system in order to bring to the minimum the relative and absolute BER values of the optical channels at the termination point.

The Control Unit 22 is capable of instructing the transmitting terminals of the channels to adjust their bit rates (solid arrows 24), thereby performing pre-emphasize of the optical channels. Optionally, CU1 22 is capable of affecting the channels from the point of such parameters as:

1) Power (dashed lines 26) which may be initiated by the control unit 22 as a result of the processing. The power may be adjusted at the transmitting terminals 12, 14 . . . N (thus performing a so-called power pre-emphasis), and/or at one or more regulating or equalization units (only two units 27, 28 are shown). Each of such units is responsible of affecting various optical equipment at an intermediate point of the transmission line and in different optical channels. For example, the regulating unit 27 or 28 may comprise a demultiplexer (DEMUX) splitting the combined signal transmitted via the fiber 18 into the initial optical channels, and a multiplexer (MUX) recombining them; each optical channel between the MUX and DEMUX can be provided with equipment pieces for variable optical attenuation or amplification, for CD compensation, for PMD compensation, etc. The power emphasis is usually provided based on OSNR value measured at the receiver terminal of each of the channels and by applying higher power to channels having lower OSNR values and vice versa, while taking into account the recommended priority ratio(s). The power emphasis can be thus provided via the regulating units 27, 28 (arrows 26). Optical amplifiers 32 and 37 symbolize so-called line amplifiers or boosters which uniformly affect all optical channels and simultaneously bring noise which alters the OSNTR value in each of the channels.

2) Chromatic Dispersion, Polarization Mode, Non-Linear effects, and others. This capability is generally illustrated by dash-point arrows 30 entering the regulating units 27 and 28 and symbolizing affecting the relevant equipment units in the transmission line.

The system 10 illustrated in the drawing comprises am exemplary optical channel "X" formed on the wavelength λx, which is dropped and replaced (added) on the way. To this end, the system 10 comprises an add/drop multiplexer 31, by means of which the optical signal using wavelength λx outgoes the transmission line and is forwarded to: a client (not shown) via a control unit CU2 marked 35. To utilize the vacant optical channel, it is captioned by another optical signal which is added at the multiplexer 31 by a transmission terminal 33 and is indicated as λx'. The added optical signal λx' is received at the corresponding receiving terminal after the demultiplexer 20, parameters of this optical signal are entered to the control unit (CU1) 22 with is parameters of all other optical channels 12', 14' . . . N', and the pre-emphasis decision with respect to this channel is forwarded to the corresponding elements of the channel: its transmitting terminal 33 (arrows 24 and 26) and, optionally, to the regulating unit 28 (arrows 30 and 26). With respect to added signals like λx', the control unit 22 may issue instructions to perform power de-emphasis (power attenuation) of signals passing shorter distances.

It should be noted that the control block (CU2) 35, serving a single dropped optical channel λx, operates according to the proposed method with respect to this particular optical channel. The block collects information on parameters of the optical signal (comprising Q/BER, OSNR, CD and the like) and issues pre-emphasize instructions as to the bit rate (arrow 24) power (arrow 26) and other system parameters (arrow 30). The instructions are applied to the transmission terminal "X" of the channel and, optionally, to the relevant regulating unit 27 of the channel before the add-drop multiplexer 31.

As can be understood from the above, existence of added and dropped optical channels in the transmission line, as well as existence of regulating units in the line make it possible to perform bit rate, power and other parameters regulation at intermediate points within the common transmission line for achieving the required BER. In particular, the regulating units allow the emphasis or de-emphasis of power, and equalization of CD, NL and other parameters at arbitrary points in the optical path.

While the invention has been described with reference to particular examples, it should be appreciated that other examples and various implementations can be provided to illustrate the principle of the invention and are to be considered part thereof.

The invention claimed is:

1. A method of performing pre-emphasis of a plurality of optical channels respectively carrying a respective optical signals, by affecting bit rate of said signals, therby adjusting BER value thereof, the method comprising steps of:
   a) obtaining BER values for a group of the optical channels,
   b) determining Quality of Service priorities for said group of optical channels as a set of priority ratios,
   c) defining required ratios of BER values of the optical channels of the group as a logically inverse set of said set of priority ratios, and
   d) adjusting bit rate of at least one of the optical channels, thereby adjusting the BER value thereof to obtain real ratios of BER values of the optical channels substantially equal to said required ratios, thus regulating the obtained BER values of the optical channels of the group under constraint of said priorities.

2. The method according to claim 1, comprising a step of reducing bit rate in at least one the optical channels having the obtained BER value exceeding a maximally accepted absolute or relative BER value, thereby adjusting the BER value thereof.

3. The method according to claim 2, further comprising a preliminary step of defining the maximally accepted absolute BER value for said optical channels.

4. The method according to claim 2, wherein the step of obtaining the BER values comprises determining thereof based on the function BER $=\frac{1}{2}*\text{erfc}(Q/\sqrt{2})$, where Q is Quality factor of the signal, measured directly.

5. The method according to claim 2, wherein the step of obtaining the BER values comprises determining thereof based on the function presented in a following equation:

$$Q = \frac{OSNR}{\sqrt{2*OSNR+1}+1}\sqrt{\frac{Bo}{Be}}. \quad (2)$$

6. The method according to claim 1, wherein the step of determining the set of priority ratios is based on prices stated for transmission over different optical channels.

7. The method according to claim 1, wherein the step of determining the set of priority ratios is based on at least one required Quality of Service (QoS) parameter.

8. The method according to claim 1, wherein said steps are performed as follows:
   the determining of the set of priority ratios being performed by finding relations of stated priorities for said group of the optical channels,
   the defining of the set of required BER values is performed by considering said set of priority ratios as logically presenting an inverse set of ratios between the required BER values of said group of the channels,
   the regulation being provided by
      obtaining current BER values at each optical channel of said group and forming a set of real BER ratios for the same group of the optical channels,
      comparing the formed set of real BER ratios and said set of required BER ratios, and if not substantially equal for at least one channel of said group of channels, performing the adjustment in said at least one optical channel,
      obtaining BER values for said at least one channel from said group, where the adjustment were performed, and forming a set of new BER ratios for said group of channels,
      comparing the set of required BER ratios with the set of new BER ratios,
      continuing the adjustment until the set of new BER ratios is substantially equal to the set of required BER ratios.

9. The method according to claim 8, wherein the step of determining the set of priority ratios comprises constructing said ratios based on a priority of one of said optical channels selected as a reference to the remaining ones from the group.

10. The method according to claim 1, for regulating BER value in one or more optical channels, each comprising a transmitter terminal, a receiver terminal, one or more amplifiers and dispersive fiber elements there-between, the method further comprising a step of additional adjusting, in said at least one channel, one or more physical parameters from a list comprising power and characteristics of dispersion.

11. The method according to claim 10, wherein the step of additional adjusting is performed at an arbitrary point between a transmitting terminal and a corresponding receiving terminal.

12. The method according to claim 10, wherein the step of additional adjusting comprises power de-emphasizing with respect of the optical signals passing shorter distances.

13. A system for performing pre-emphasis in one or more optical channels carrying optical signals at respective bit rates, capable of performing the method according to claim 1.

* * * * *